(12) United States Patent
Weischedel et al.

(10) Patent No.: US 8,131,536 B2
(45) Date of Patent: Mar. 6, 2012

(54) EXTRACTION-EMPOWERED MACHINE TRANSLATION

(75) Inventors: Ralph M. Weischedel, Canton, MA (US); Jinxi Xu, Framingham, MA (US); Michael R. Kayser, Somerville, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1026 days.

(21) Appl. No.: 11/998,663

(22) Filed: Nov. 30, 2007

(65) Prior Publication Data
US 2008/0215309 A1 Sep. 4, 2008

Related U.S. Application Data

(60) Provisional application No. 60/880,344, filed on Jan. 12, 2007.

(51) Int. Cl.
*G06F 17/28* (2006.01)
(52) U.S. Cl. ................................. 704/5; 704/2
(58) Field of Classification Search .................. 704/1–8
See application file for complete search history.

(56) References Cited

U.S. PATENT DOCUMENTS

| 4,599,691 | A | 7/1986 | Sakaki |
| 4,754,326 | A | 6/1988 | Kram et al. |
| 4,809,351 | A | 2/1989 | Abramovitz et al. |
| 4,914,590 | A | 4/1990 | Loatman et al. |
| 5,062,143 | A | 10/1991 | Schmitt |
| 5,343,537 | A | 8/1994 | Bellegarda et al. |
| 5,396,419 | A | * | 3/1995 | Morimoto ........................ 704/2 |
| 5,406,480 | A | | 4/1995 | Kanno et al. |
| 5,418,717 | A | | 5/1995 | Su et al. |
| 5,438,630 | A | | 8/1995 | Chen et al. |
| 5,492,473 | A | | 2/1996 | Shea |
| 5,544,257 | A | | 8/1996 | Bellegarda et al. |
| 5,694,559 | A | | 12/1997 | Hobson et al. |
| 5,745,113 | A | | 4/1998 | Jordan et al. |
| 5,752,052 | A | | 5/1998 | Richardson et al. |
| 5,757,960 | A | | 5/1998 | Murdock et al. |
| 5,787,198 | A | | 7/1998 | Agazzi et al. |
| 5,822,747 | A | | 10/1998 | Graefe |
| 5,839,106 | A | | 11/1998 | Bellegarda |
| 5,841,895 | A | | 11/1998 | Huffman |
| 5,862,259 | A | | 1/1999 | Bokser et al. |
| 5,903,858 | A | | 5/1999 | Saraki |

(Continued)

FOREIGN PATENT DOCUMENTS

CA 2 485 554 11/2003

(Continued)

OTHER PUBLICATIONS

Ramshaw, "Statistical Models for Information Extraction", JHU Summer School on Human Language Technology, Jun. 2004.

(Continued)

*Primary Examiner* — Samuel G Neway
(74) *Attorney, Agent, or Firm* — Ropes & Gray LLP

(57) ABSTRACT

The invention relates to systems and methods for automatically translating documents from a first language to a second language. To carry out the translation of a document, elements of information are extracted from the document and are translated using one or more specialized translation processes. The remainder of the document is separately translated by a statistical translation process. The translated elements of information and the translated remainder are then merged into a final translated document.

16 Claims, 6 Drawing Sheets

U.S. PATENT DOCUMENTS

| | | | |
|---|---|---|---|
| 5,926,180 A | 7/1999 | Shimamura | |
| 5,926,784 A | 7/1999 | Richardson et al. | |
| 5,933,525 A | 8/1999 | Makhoul et al. | |
| 5,940,821 A | 8/1999 | Wical | |
| 5,963,940 A | 10/1999 | Liddy et al. | |
| 5,963,965 A | 10/1999 | Vogel | |
| 6,006,221 A | 12/1999 | Liddy et al. | |
| 6,021,403 A | 2/2000 | Horvitz | |
| 6,026,388 A | 2/2000 | Liddy et al. | |
| 6,029,195 A | 2/2000 | Herz | |
| 6,105,022 A | 8/2000 | Takahashi et al. | |
| 6,112,168 A | 8/2000 | Corston et al. | |
| 6,167,369 A | 12/2000 | Schulze | |
| 6,243,669 B1 | 6/2001 | Horiguchi et al. | |
| 6,243,670 B1 | 6/2001 | Bessho | |
| 6,260,035 B1 | 7/2001 | Horvitz et al. | |
| 6,278,967 B1 | 8/2001 | Akers et al. | |
| 6,278,968 B1 | 8/2001 | Franz et al. | |
| 6,304,870 B1 | 10/2001 | Kushmerick et al. | |
| 6,430,552 B1 | 8/2002 | Corston-Oliver | |
| 6,442,584 B1 | 8/2002 | Kolli et al. | |
| 6,600,501 B1 | 7/2003 | Israel et al. | |
| 6,606,625 B1 | 8/2003 | Muslea et al. | |
| 6,609,087 B1 | 8/2003 | Miller et al. | |
| 6,615,207 B1 | 9/2003 | Lawrence | |
| 6,681,044 B1 | 1/2004 | Ma et al. | |
| 6,785,673 B1 | 8/2004 | Fernandez et al. | |
| 6,795,825 B2 | 9/2004 | Rishe | |
| 6,839,714 B2 | 1/2005 | Wheeler et al. | |
| 6,853,992 B2 | 2/2005 | Igata | |
| 6,892,189 B2 | 5/2005 | Quass et al. | |
| 6,950,753 B1 | 9/2005 | Rzhetsky et al. | |
| 7,031,970 B2 | 4/2006 | Blitzer | |
| 7,062,483 B2 | 6/2006 | Ferrari | |
| 7,081,834 B2 | 7/2006 | Ruokangas et al. | |
| 7,143,091 B2 | 11/2006 | Charnock et al. | |
| 7,146,030 B2 | 12/2006 | Vailaya et al. | |
| 7,146,349 B2 | 12/2006 | Benitez-Jimenez et al. | |
| 7,149,687 B1 | 12/2006 | Gorin et al. | |
| 7,287,026 B2 | 10/2007 | Oommen | |
| 7,292,976 B1 | 11/2007 | Hakkani-Tur et al. | |
| 7,496,621 B2 | 2/2009 | Pan et al. | |
| 7,530,020 B2 | 5/2009 | Szabo | |
| 7,620,538 B2 | 11/2009 | Marcu et al. | |
| 7,853,444 B2* | 12/2010 | Wang et al. | 704/2 |
| 7,890,539 B2 | 2/2011 | Boschee et al. | |
| 7,987,176 B2 | 7/2011 | Latzina et al. | |
| 2001/0029455 A1* | 10/2001 | Chin et al. | 704/277 |
| 2002/0007383 A1 | 1/2002 | Yoden et al. | |
| 2002/0035466 A1* | 3/2002 | Kodama | 704/4 |
| 2002/0143537 A1 | 10/2002 | Ozawa et al. | |
| 2003/0078766 A1 | 4/2003 | Appelt et al. | |
| 2003/0093613 A1 | 5/2003 | Sherman | |
| 2003/0120640 A1 | 6/2003 | Ohta et al. | |
| 2003/0189933 A1 | 10/2003 | Ozugur et al. | |
| 2003/0191626 A1* | 10/2003 | Al-Onaizan et al. | 704/8 |
| 2003/0208499 A1 | 11/2003 | Bigwood et al. | |
| 2003/0212543 A1 | 11/2003 | Epstein et al. | |
| 2003/0216905 A1 | 11/2003 | Chelba et al. | |
| 2004/0039734 A1 | 2/2004 | Judd et al. | |
| 2004/0049495 A1 | 3/2004 | Lee et al. | |
| 2004/0054521 A1 | 3/2004 | Liu | |
| 2004/0078190 A1 | 4/2004 | Fass et al. | |
| 2004/0098670 A1 | 5/2004 | Carroll | |
| 2004/0107118 A1 | 6/2004 | Harnsberger et al. | |
| 2004/0111253 A1 | 6/2004 | Luo | |
| 2004/0162806 A1 | 8/2004 | Liu | |
| 2004/0243531 A1 | 12/2004 | Dean | |
| 2005/0039123 A1 | 2/2005 | Kuchinsky et al. | |
| 2005/0278325 A1 | 12/2005 | Mihalcea et al. | |
| 2005/0283365 A1 | 12/2005 | Mizutani et al. | |
| 2006/0015320 A1* | 1/2006 | Och | 704/2 |
| 2006/0036592 A1 | 2/2006 | Das et al. | |
| 2006/0116866 A1 | 6/2006 | Suzuki et al. | |
| 2006/0242101 A1 | 10/2006 | Akkiraju et al. | |
| 2006/0245641 A1 | 11/2006 | Viola et al. | |
| 2006/0253274 A1 | 11/2006 | Miller | |
| 2006/0253476 A1 | 11/2006 | Roth et al. | |
| 2007/0011150 A1 | 1/2007 | Frank | |
| 2007/0136246 A1 | 6/2007 | Stenchikova et al. | |
| 2007/0233696 A1 | 10/2007 | Ishihara et al. | |
| 2008/0040095 A1* | 2/2008 | Sinha et al. | 704/2 |
| 2009/0006447 A1 | 1/2009 | Balmin et al. | |
| 2009/0024385 A1 | 1/2009 | Hirsch | |
| 2009/0063473 A1 | 3/2009 | Van Den Berg et al. | |

FOREIGN PATENT DOCUMENTS

| | | |
|---|---|---|
| JP | 59-208673 | 11/1984 |
| JP | 60-247784 | 12/1985 |
| JP | 11-109843 | 4/1999 |
| JP | 2007-18462 | 1/2007 |
| WO | WO 93/18483 | 9/1993 |
| WO | WO 02/37328 | 5/2002 |
| WO | WO 03/098466 | 11/2003 |

OTHER PUBLICATIONS

Thompson, et al., "Active learning for natural language parsing and information extraction", Proc. of 6th International Machine Learning Conference, Jun. 1999.

Office Action issued in U.S. Appl. No. 11/411,206 on Dec. 19, 2008.

Office Action issued in U.S. Appl. No. 10/806,406 on Sep. 5, 2007.

Office Action issued in U.S. Appl. No. 10/806,406 on Jan. 19, 2007.

ACE (Automatic Content Extraction) English Annotation Guidelines for Entities, Ver.5.6.1, Linguistic Data Consortium, 34 pages. May 2005. http://www.ldc.upenn.edu/Projects/ACE/.

Agazzi, O.E., et al., "Hidden Markov Model Based Optical Character Recognition in the Presence of Deterministic Transformations," Pattern Recognition, vol. 26, No. 12, pp. 1813-1826, Dec. 1993.

Al-Badr, B., et al., "Survey and bibliography of Arabic optical text recognition," Signal Processing, vol. 41, No. 1, pp. 49-77, Jan. 1995.

Anigbogu, J.C., et al., "Performance Evaluation of an HMM Based OCR System," Proceedings of the 11th International Conference on Pattern Recognition, The Hague, The Netherlands, pp. 565-568, Aug. 1992.

Andreevskaia, A., et al., "Can Shallow Predicate Argument Structures Determine Entailment?," Proceedings from the 1st PASCAL Recognising Textual Entailment Challenge (RTE I), 4 pages, Southampton, UK, Apr. 2005.

Aone, C., et al., "SRA: Description of the IE2 System Used for MUC-7," Proceedings of the 7th Message Understanding Conference (MUC-7), pp. 1-14, 1998. Available at: http://www.itl.nist.gov/iaui/894.02/related_projects/muc/proceedings/muc_7_proceedings/sra_muc7.pdf.

Barzilay, R., et al., "Sentence Fusion for Multidocument News Summarization," Association for Computational Linguistics, vol. 31, No. 3, pp. 297-327, Sep. 2005.

Bellegarda, J., et al., "Tied Mixture Continuous Parameter Models for Large Vocabulary Isolated Speech Recognition," IEEE International Conference on Acoustics, Speech, and Signal Processing, pp. 13-16, May 23-26, 1989.

Bennett, S.W., et al., "Learning to Tag Multilingual Texts Through Observation," Proceedings of the Second Conference on Empirical Methods in Natural Language Processing, Association for Computational Linguistics, pp. 109-116, 1997.

Bippus, et al., "Cursive Script Recognition Using Semi Continuous Hidden Markov Models in Combination with Simple Features," IEE European Workshop on Handwriting Analysis and Recognition, pp. 6/1-6/6, Brussels, Jul. 1994.

Bock, J., et al., "Conceptual accessibility and syntactic structure in sentence formulation," Cognition 21, pp. 47-67, 1985.

Bose, et al., "Connected and Degraded Text Recognition Using Hidden Markov Model," Proceedings of the 11th International Conference on Pattern Recognition, vol. II, pp. 116-119, Aug. 3-Sep. 2, 1992.

Brill, E., "Automatic Grammar Induction and Parsing Free Text: A Transformation-Based Approach," Proceedings of the 31st Annual Meeting of the Association for Computational Linguistics, pp. 259-265, 1993.

Cardie, C., "Empirical Methods in Information Extraction," American Association of Artificial Intelligence (AAAI), vol. 18, No. 4, pp. 65-80, 1997.

Collins, M., "Three Generative, Lexicalised Models for Statistical Parsing," Proceedings of the 35th Annual Meeting of the Association for Computational Linguistics and 8th Conference of the European Chapter of the Association for Computational Linguistics, pp. 16-23, 1997.

Conrad, J.G., "A system for Discovering Relationships by Feature Extraction from Text Databases," Proceedings of the 17th Annual International ACM SIGIR Conference on Research and Development in Information Retrieval (SIGIR-94), pp. 260-270, 1994.

Cowie, J., "Information Extraction," Communications of the ACM, vol. 39, Issue 1, pp. 80-91, Jan. 1996.

De Marneffe, M.-C., et al., "Generating Typed Dependency Parses from Phrase Structure Parses"; Proceedings of 5th International Conference on Language Resources and Evaluation, pp. 1-6, Genoa, Italy, 2006.

De Salvo Braz, R., et al., "Knowledge Representation for Semantic Entailment and Question-Answering," Department of Computer Science, University of Illinois, pp. 1-10, 2005.

Dowding, J., et al., "Gemini: A Natural Language System for Spoken-Language Understanding," Annual Meeting of the Association for Computational Linguistics, pp. 54-61, Columbus, OH, 1993.

Fellbaum, C., "WordNet, an Electronic Lexical Database," MIT Press, 422 pages, Cambridge, MA, 1998.

Finn, A., et al., "Active Learning Selection Strategies for Information Extraction," Proceedings of the International Workshop on Adaptive Text Extraction and Mining, pp. 1-8, 2003.

Florian, R., et al., "A Statistical Model for Multilingual Entity Detection and Tracking," Proceedings of Human Language Technology Conference North American Association for Computational Linguistics, pp. 1-8, Boston, MA, 2004.

Forney, G.D., et al., "The Viterbi Algorithm," Proceedings of the IEEE, vol. 61, No. 3, pp. 268-278, 1973.

Gildea, D., "Loosely Tree-Based Alignment for Machine Translation," Proceedings of the 41st Annual Meeting of the Association for Computational Linguistics, pp. 80-87, Supporo, Japan, 2003.

Goldman, S., et al., "Enhancing Supervised Learning with Unlabeled Data," Proceedings of the 17th International Conference on Machine Learning (ICML-00), pp. 327-334, San Francisco, CA, 2000.

Gonzalez, et al., "Digital Image Processing," Addison-Wesley Pub. Co., pp. 416-418, 1992.

Grishman, R., "Information Extraction," Handbook of Computational Linguistics, pp. 1-11, 2003.

Grishman, R., "Adaptive Information Extraction and Sublanguage Analysis" Proceedings of the Workshop on Adaptive Text Extraction and Mining, 17th International Joint Conference on Artificial Intelligence (IJCAI-2001), pp. 1-4, Seattle, Washington, Aug. 2001.

Grishman, R., et al., "NYU's English ACE 2005 System Description," ACE 05 Evaluation Workshop, 2005. Online at http://nlp.cs.nyu.edu/publication.

Grisham, R., "Discovery Methods for Information Extraction," Proceedings of the ISCA & IEEE Workshop on Spontaneous Speech Processing and Recognition, Tokyo Institute of Technology, pp. 1-5, Tokyo, Japan, Apr. 2003.

Hasegawa, T., et al., "Discovering Relations among Named Entities from Large Corpora," Proceedings of the 42nd Annual Meeting of Association of Computational Linguistics (ACL-04), pp. 415-422, Barcelona, Spain, 2004.

Herrera, J., et al., "Textual Entailment Recognition Based on Dependency Analysis and WordNet," Proceedings of the 1st PASCAL Challenges Workshop on Recognising Textual Entailment, pp. 21-24, Southampton, UK, Apr. 2005.

Hoffmann C.M., et al., "Pattern Matching in Trees"; Journal of the Association for Computer Machinery, vol. 29, No. 1, pp. 68-95, Jan. 1982.

Humphreys, K., et al., "University of Sheffield: Description of the LaSIE-II System as Used for MUC-7," Proceedings of the 7th Message Understanding Conference (MUC-7), pp. 1-20, 1998. Available at: http://www.itl.nist.gov/iaui/894.02/related_projects/muc/proceedings/muc_7_proceedings/sheffield_muc7.pdf.

Ji, H., et al., "Applying Coreference to Improve Name Recognition," Proceedings of the ACL 2004 Workshop on Reference Resolution and Its Applications, pp. 1-8, Barcelona, Spain, Jul. 2004.

Jones, R., et al., "Active Learning for Information Extraction with Multiple View Feature Sets," 20th International Workshop on Adaptive Text Extraction and Mining, pp. 1-8, Washington, DC, Aug. 21-24, 2003.

Kaltenmeier, et al., "Sophisticated Topology of Hidden Markov Models for Cursive Script Recognition," Proceedings of the Second International Conference on Document Analysis and Recognition, pp. 139-142, Tsukuba, Japan, Oct. 1993.

Kambhatla, N., "Combining Lexical, Syntactic, and Semantic Features with Maximum Entropy Models for Extracting Relations," Proceedings of the 42nd Anniversary Meeting of the Association for Computational Linguistics, pp. 1-4, 2004.

Karov, Y., et al., "Similarity-based Word Sense Disambiguation," Association for Computational Linguistics, vol. 24, Issue 1, pp. 1-26, Mar. 1998.

Kehler, A., et al., "The (Non) Utility of Predicate-Argument Frequencies for Pronoun Interpretation" Proceedings of Human Language Technology Conference, pp. 289-296, 2004.

Kehler, A. "Probabilistic Coreference in Information Extraction," Proceeding of the 2nd Conference on Empirical Methods in Natural Language Processing (EMNLP-2), pp. 163-173, Providence, RI, Aug. 1-2, 1997.

Kehler, A., et al., "Competitive Self-Trained Pronoun Interpretation," Proceedings of the Human Language Technology Conference, North American Chapter of the Association for Computational Linguistics, pp. 33-36, May 2004.

Kehler, A., "Current Theories of Centering for Pronoun Interpretation: A Critical Evaluation," Computational Linguistics, vol. 23, No. 3, pp. 467-475, 1997.

Kopec, G., et al., "Document Image Decoding Using Markov Source Models," IEEE Transactions on Pattern Analysis and Machine Intelligence, vol. 16, pp. 1-13, 1994.

Kilpeläinen, P., "Tree Matching Problems with Applications to Structure Text Databases," PhD thesis, Department of Computer Science, University of Helsinki, 113 pages, Finland, Nov. 1992.

Kingsbury, P., et al., "Adding Semantic Annotation to the Penn TreeBank"; Proceedings of the Human Language Technology Conference, pp. 1-5, San Diego, CA, 2002.

Kouylekov, M., et al., "Recognizing Textual Entailment with Tree Edit Distance Algorithms," Proceedings of Pascal Challenges Workshop on Recognising Textual Entailment, pp. 17-20, Southampton, UK, Apr. 2005.

Kundu, A., et al., "Recognition of Handwritten Script: a Hidden Markov Model Based Approach," Journal of the Pattern Recognition Society, Pergamon Press, vol. 22, No. 3, 283-297, 1989.

Lapata, M., "Probabilistic Text Structuring: Experiments with Sentence Ordering," Proceedings of the 41st Annual Meeting of the Association for Computational Linguistics, pp. 545-552, Jul. 2003.

Lehnert, W., et al., "UMass/Hughes: Description of the Circus System Used for MUC-5," Proceedings of the Fifth Message Understanding Conference (MUC-5), pp. 1-16, 1993.

Levin, E., et al., "Dynamic Planar Warping for Optical Character Recognition," Proceedings of the International Conference on Acoustics, Speech, and Signal Processing, vol. III, pp. 149-152, Mar. 1992.

Levit, M., "Spoken Language Understanding without Transcriptions in a Call Canter Scenario," PhD thesis, 249 pages, Logos Verlag, Berlin, Germany, 2005.

Makhoul, J., et al., "Vector Quantization in Speech Coding," Proceedings of IEEE, vol. 73, No. 11, pp. 1551-1588, Nov. 1985.

Marcus, M.P., et al., "Building a Large Annotated Corpus of English: The Penn Treebank," Computational Linguistics, vol. 19, No. 2, pp. 313-330, 1993.

Miller, S., et al., "Name Tagging with Word Clusters and Discriminative Training," Proceedings of the Human Language Technology Conference and Meeting of the North American Association for Computational Linguistics, pp. 337-342, 2004.

Moldovan, D., et al., "COGEX: A Logic Prover for Question Answering," Proceedings of the Human Language Technology and North American Chapter of the Association of Computational Linguistics Conference, vol. 1, pp. 87-93, Edmonton, Canada, 2003.

Narayanan S., et al., "Question Answering Based on Semantic Structures"; Proceedings of the 20th International Conference on Computational Linguistics (COLING-2004), Geneva, Switzerland, Aug. 2004.

Nguyen, L., et al., "The 1994 BBN/BYBLOS Speech Recognition System," Proceedings of the ARPA Spoken Language Systems Technology Workshop, Morgan Kaufmann Publishers, pp. 77-81, Jan. 1995.

Nigam, K., et al., "Text Classification from Labeled and Unlabeled Documents using EM " Machine Learning, vol. 39, Issue 2-3, pp. 103-134, 2000.

Pang, B., et al., "Syntax-Based Alignment of Multiple Translations: Extracting Paraphrases and Generating New Sentences," Proceedings of the Human Language Technology and North American Chapter of the Association of Computational Linguistics Conference, pp. 102-109, Edmonton, Canada, 2003.

Park, H.-S., et al., "Off-line Recognition of Large-set Handwritten Characters with Multiple Hidden Markov Models," Pattern Recognition, vol. 29, No. 2, pp. 231-244, Elsevier Science Ltd, Great Britain, 1996.

Patten, T., et al., "Description of the TASC System Used for MUC-7," Proceedings of the 7th Message Understanding Conference (MUC-7), pp. 1-5, Fairfax, VA, 1998. Available at: http://www.itl.nist.gov/iaui/894.02/related_projects/muc/proceedings/muc_7_proceedings/tasc_muc7.pdf.

Pereira, F.C.N., et al., "Prolog and Natural-Language Analysis," Microtome Publishing, 204 pages, 2002.

Phillips, I.T., et al., "CD-ROM document database standard," Proceedings of the 2nd International Conference Document Analysis and Recognition, Tsukuba Science City, Japan, pp. 478-483, 1993.

Quirk, C., et al., "Dependency Treelet Translation: Syntactically Informed Phrasal SMT," Proceedings from the 43rd Annual Meeting of the Association for Computational Linguistics, pp. 271-279, Jun. 2005.

Rabiner, L., "A Tutorial on Hidden Markov Models and Selected Applications in Speech Recognition," Proceedings of the IEEE, vol. 77, No. 2, pp. 257-286, Feb. 1989.

Radev, D.R., et al., "Generating Natural Language Summaries from Multiple On-line Sources", Computational Linguistics, vol. 24, No. 3, pp. 469-500, 1998.

Ramshaw, L., et al., "Experiments in Multi-Modal Automatic Content Extraction," Proceedings of the 1st International Conference on Human Language Technology Research, pp. 1-4, San Diego, CA, 2001.

Riloff, E., "Automatically Generating Extraction Patterns from Untagged Text," Proceedings of the 13th National Conference on Artificial Intelligence (AAAI-96), pp. 1044-1049.

Sekine. S., "Named Entity: History and Future," Proteus Project Report, 2004.

Shwartz, R., "A Comparison of Several Approximate Algorithms for Finding Multiple (N-BEST) Sentence Hypotheses," Proceedings of the IEEE International Conference on Acoustics, Speech and Signal Processing (ICASSP), vol. 1, pp. 701-704, May 1993.

Schwartz, R.M., et al., "Improved Hidden Markov Modeling of Phonemes for Continuous Speech Recognition," Proceedings of the ICASSP, vol. 9, pp. 21-24, 1984.

Shinyama, Y., et al., "Named Entity Discovery Using Comparable News Articles," Proceedings of the International Conference on Computational Linguistics (COLING); pp. 848-853, 2004.

Sin, et al., "A Statistical Approach with HMMs for On-Line Cursive Hangul (Korean Script) Recognition," Proceedings of the Second International Conference on Document Analysis and Recognition, pp. 147-150, Oct. 1993.

Starner, T., et al., "On-Line Cursive Handwriting Recognition Using Speech Recognition Methods," IEEE International Conference on Acoustics, Speech, and Signal Processing, vol. 5, pp. V/125-V/128, Apr. 19-22, 1994.

Stone, M., et al., "Sentence Planning as Description Using Tree Adjoining Grammar," Proceedings of the 35th Annual Meeting of the Association for Computational Linguistics, pp. 198-205, Madrid, Spain, 1997.

Sudo, K., et al., "Cross-lingual Information Extraction System Evaluation," Proceedings from the International Conference on Computational Linguistics (COLING); pp. 882-888, 2004.

Sudo, K., et al., "An Improved Extraction Pattern Representation Model for Automatic IE Pattern Acquisition" Proceedings of the 41st Annual Meeting of the Association for Computational Linguistics, pp. 2224-2231, Jul. 2003.

Uchimoto, K., et al. "Word Translation by Combining an Example-Based Method and Machine Learning Models" J. Natural Language Processing, vol. 10, No. 3, pp. 87-114, 2003.

Vishwanathan, S.V.N., et al., "Fast Kernels for String and Tree Matching," Neural Information Processing Systems, 8 pages, MIT Press, 2004.

Vlontzos, J.A., et al., "Hidden Markov Models for Character Recognition," IEEE Transactions on Image Processing, vol. 1, Issue 4, pp. 539-543, Oct. 1992.

Wang, J.T.-L., et al., "A System for Approximate Tree Matching," IEEE Transactions on Knowledge and Data Engineering, vol. 6, No. 4, pp. 559-571, Aug. 1994.

Wu, D., "Stochastic Inversion Transduction Grammars and Bilingual Parsing of Parallel Corpora," Association for Computational Linguistics, vol. 23, No. 3, pp. 377-403, Sep. 1997.

Yangarber, R., "Counter-Training in Discovery of Semantic Patterns," Proceedings of the 41st Annual Meeting for Computational Linguistics, pp. 343-350, Japan, 2003.

Yangarber, R., et al., "Unsupervised Learning of Generalized Names," Proceedings of the 19th International Conference on Computational Linguistics (COLING-02), pp. 1-7, 2002.

Yangarber, R., et al., "NYU: Description of the Proteus/PET System as Used for MUC-7 ST," Proceedings of the 7th Message Understanding Conference (MUC-7), pp. 1-7, 1998. Available at: http://www.itl.nist.gov/iaui/894.02/related_projects/muc/proceedings/muc_7_proceedings/nyu_st_paper.pdf.

Younger, D.H., "Recognition and Parsing of Context-Free Languages in Time $n^3$,", Information and Control, vol. 10, pp. 189-208, 1967.

Zelenko, D., et al., "Kernel Methods for Relation Extraction," Journal of Machine Learning Research, vol. 3, pp. 1083-1106, Mar. 2003.

Zhao, S., et al., "Extracting Relations with Integrated Information Using Kernel Methods," Proceedings of the 43rd Annual Meeting of ACL, pp. 419-426, Jun. 2005.

Zhao, S., et al., "Discriminative Slot Detection Using Kernel Methods," Proceedings of the 20th International Conference on Computational Linguistics (COLING-04), pp. 1-7, Geneva, Switzerland, 2004.

Office Action issued in U.S. Appl. No. 10/806,406 on Apr. 29, 2008.
Office Action issued in U.S. Appl. No. 11/411,206 on Aug. 13, 2009.
Office Action issued in U.S. Appl. No. 11/974,022 on Nov. 24, 2009.
Office Action issued in U.S. Appl. No. 11/974,022 on Jun. 10, 2010.
Office Action issued May 25, 2011 in U.S. Appl. No. 12/240,605.
Office Action issued in U.S. Appl. No. 13/012,225 on Sep. 29, 2011.

* cited by examiner

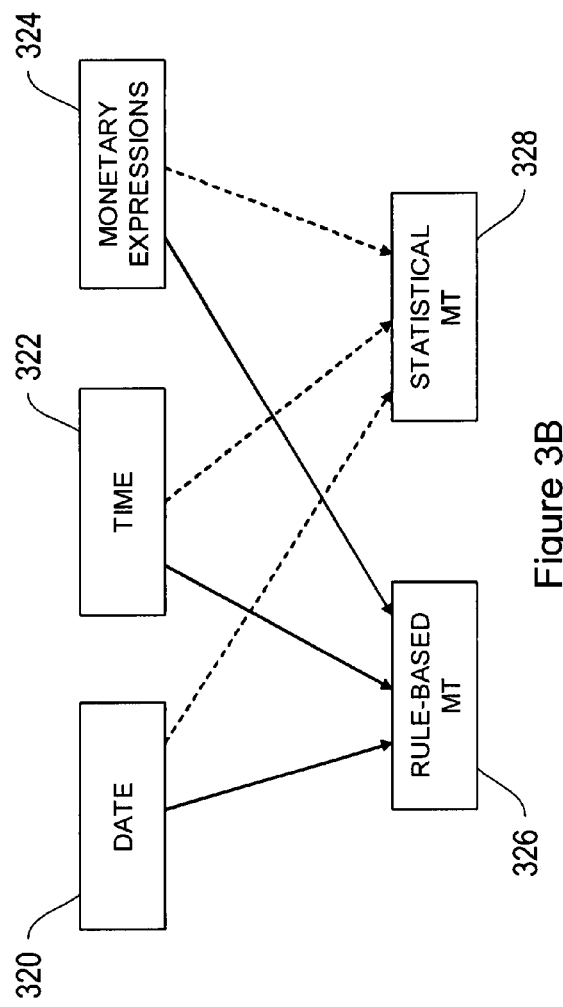
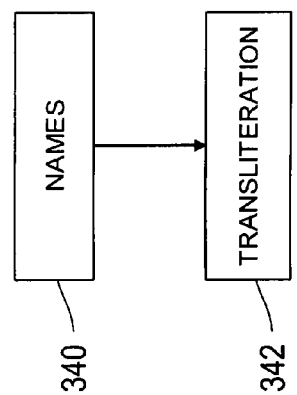
Figure 3B
Figure 3C

EXTRACTION-EMPOWERED MACHINE TRANSLATION

CROSS REFERENCE TO RELATED APPLICATIONS

This application claims priority under 35 U.S.C. §119(e) to U.S. Provisional Application No. 60/880,344 titled "Extraction-Empowered Machine Translation" filed Jan. 12, 2007, the entirety of which is also hereby incorporated by reference.

GOVERNMENT CONTRACT

The U.S. Government has a paid-up license in this invention and the right in limited circumstances to require the patent owner to license others on reasonable terms as provided for by the terms of Contract No. NBCHC050081 awarded by the Department of the Interior.

BACKGROUND

Machine translation (MT) is the automatic translation of text from one language to another using a computer system. At a basic level, MT provides translations of individual words from one language to another. One type of machine translation is rule-based MT, in which words are translated based on linguistic rules. Generally, rule-based methods first parse an input text and create an intermediate, symbolic representation of the text, and then use this representation to generate the translation of the text in the target language. One drawback of rule-based MT is that it requires large sets of hand-crafted rules and grammars. Another type of machine translation is statistical machine translation, in which the translation is generated based on statistical models. The parameters of the statistical model are derived from bilingual text corpora, and key to the performance of these systems is the availability of massive amounts of translated documents (e.g., in some cases including 80 million words or more) for the major U.N. languages (Arabic, Chinese, English, French, Russian, and Spanish). For less common languages, large amounts of translated documents are not available. Systems and methods are needed for providing MT without requiring large sets of hand-crafted rules or massive amounts of translated documents.

SUMMARY

Presented herein are systems, methods, and devices for machine translation. Machine Translation takes text (e.g., online text, transcribed speech, or OCRed print media) in one language and translates it to a second language. For example, the input text to a machine translator may be Arabic newswire, and the output text may be an equivalent version in English.

BRIEF DESCRIPTION OF THE FIGURES

The foregoing and other objects and advantages of the invention will be appreciated more fully from the following further description thereof, with reference to the accompanying drawings. These depicted embodiments are to be understood as illustrative of the invention and not as limiting in any way.

FIGS. 3A-3C depict translation processes for exemplary elements of information, according to an illustrative embodiment of the invention.

DETAILED DESCRIPTION

To provide an overall understanding of the invention, certain illustrative embodiments will now be described, including systems, methods and devices for machine translation. However, it will be understood by one of ordinary skill in the art that the systems and methods described herein can be adapted and modified for other suitable applications and that such other additions and modifications will not depart from the scope hereof.

An exemplary application is to offer the machine translation within the Broadcast Monitoring System suite, a product provided by BBN Technologies Corp. of Cambridge, Mass., which monitors, transcribes, and translates broadcast media content in multiple languages for near-real time search and analysis. Additionally, it could be an independent component applied to text. There are many languages where there are currently few/no commercial machine translation products (e.g., Farsi, Korean, Pashto, That, Urdu, . . . ). Other applications include commercial applications, e.g., English language web access to non-English sites.

In contrast to traditional rule-based systems, which require massive sets of hand-crafted rules and grammars to function, the approach of the current system uses minimal manual work because of the trainable algorithms at its core. Hand-crafted transfer rules are limited to high-value pieces of information that a pure trainable system cannot handle well without massive amounts of training data. Since such high-value pieces of information (e.g. entities, descriptions and relations) usually have a very simple structure, a little manual work in rule creation can produce a great gain in performance.

Figure 1:
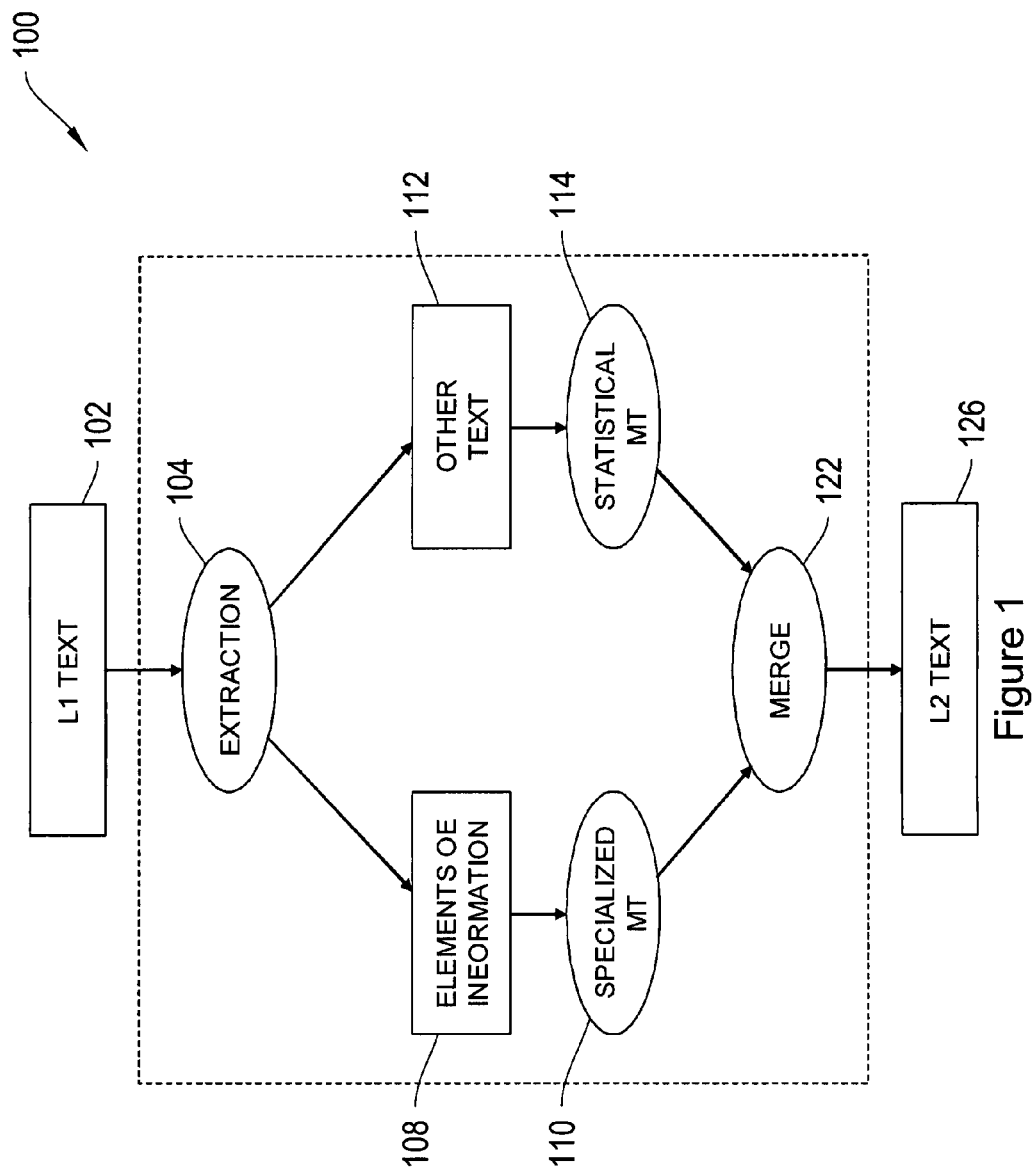
FIG. 1 is a diagram depicting an exemplary machine translation process, according to an illustrative embodiment of the invention.

FIG. 1 is a diagram depicting an exemplary machine translation system 100 according to one embodiment of the invention. A text 102 in a first language is input into an extraction module 104, which extracts selected elements of information (EIs) 108 from the text, and outputs the EIs 108 and a text remainder 112. The text remainder 112 includes placeholders for the extracted EIs, as described in greater detail with respect to FIG. 2. The text remainder 112 is sent to a statistical machine translation module 114, where it is translated using statistical machine translation. The EIs 108 are translated using specialized translation process modules 110, where the selected translation process depends on the type of EI being translated, as described in greater detail below with respect to FIGS. 3A-3C. The specialized translation process modules 110 and the statistical MT module 114 may output multiple possible translations, as well as the probability of each output translation possibility. The outputs of the statistical MT module 114 and specialized translation process modules 110 are sent to a merge module 122, which determines multiple ways of integrating the translated EIs into the possible text remainder translations, and estimates the probability of each possibility. The merge module 122 selects the most likely integration possibility, and merges the selected EI translations with the selected text remainder. The merge module 112 outputs the translated text 126 in language L2. The various steps of the process shown in FIG. 1 are described in greater detail below with respect to FIGS. 2-4.

According to various embodiments, the specialized translation process 110 and the statistical machine translation process 114 can be carried out serially or in parallel.

According to various embodiments, the machine translation process 100 uses word meaning (the extracted information) and linguistic knowledge (the syntax of, for example, dates/times) to yield high performance translation of important information from the L1 text. That is, for example, using an information extraction process at the extraction module 104, named entities, dates, times, amounts, core noun phrase descriptions, and other classes of information are identified in the native language of the L1 text 102. The extracted elements of information are translated or transliterated as appropriate using a first translation process.

In one implementation, the extraction module 104, the statistical MT module 114, the specialized translation process modules 110, and the merger module 122 are implemented as software. The modules include computer executable instructions, programmed, for example, in C, C++, JAVA, LISP, or other programming language known to those skilled in the art. The computer executed instructions are stored on computer readable media, such as magnetic disks, optical disks, magneto-optical disks, holographic disks, magnetic tapes, or integrated circuits (e.g., flash memory cards). The modules 104, 110, 114, and 122, upon execution, are loaded into a volatile system memory associated with one or more processors. Two or more of the modules 104, 110, 114, and 122, may execute in a memory shared by one or more processors. Similarly, two or more modules may be executed by a single processor. Alternatively, each module 104, 110, 114, and 122 may execute on its own processor with its own memory. The processors may be single or multi-core processors. The processors may be general purpose processors, special purpose processors, digital signal processors, or other form of integrated circuit. In various implementations, one or more of the modules is located on a first computing device, such as a desktop computer, a laptop computers, a personal digital assistant, a cell phone, or other computing device.

In one implementation, the system 100 also includes a user interface module for accepting translation instructions and outputting translated documents. Translated documents may be output to a display screen, to a printer, or to a speaker via a text to speech process. The user interface may also be coupled to a document input device, such as a camera, a speech-to-text-process, a scanner, or a source of digital text information, such as an attached computer readable data store, a remote server, or the Internet. The user interface module may execute on the same computing device as the remaining modules 104, 110, 114, 122, or it may communicate with the remaining modules 104, 110, 114, and 122 over a wired or wireless network.

Figure 2:
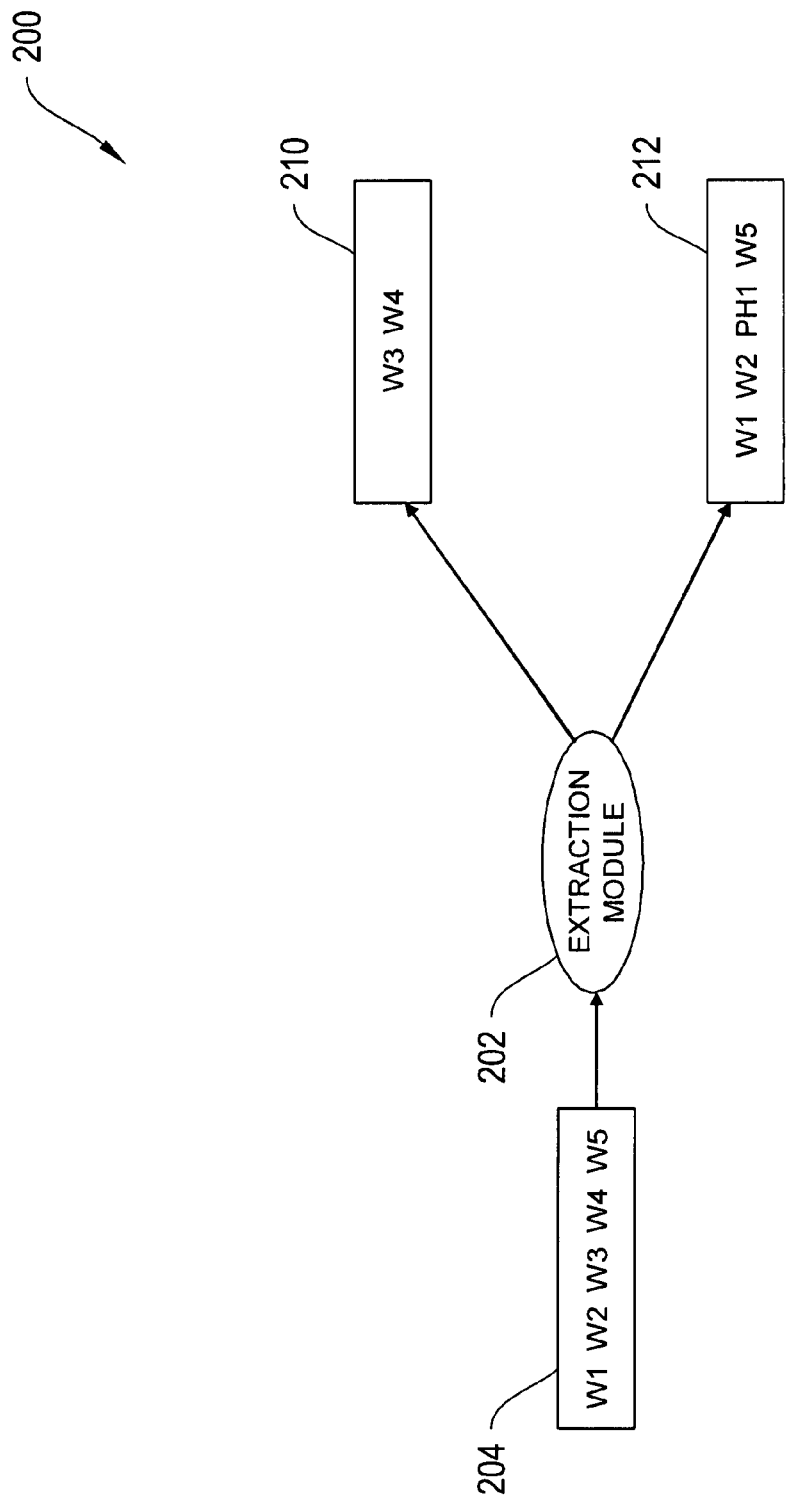
FIG. 2 is a diagram depicting an extraction process, according to an illustrative embodiment of the invention.

FIG. 2 is a diagram of an extraction process 200. In the extraction process 200, an extraction module 202 extracts EIs from a text 204. As shown in FIG. 2, words W1-W5 are input to the extraction module 202. The extraction module 202 identifies words w3 and w4 as EIs, and extracts words w3 and w4 from the text 204. The extraction module 202 outputs the EIs 210, and the remainder of the text, 212. The text 212 remainder includes a copy of the input words w1, w2, and w5, with the extracted words w3 and w4 replaced by a placeholder ph1. In this example, words w3, and w4, are clustered to form a single EI 210. In various examples, words w3 and w4 may by a core noun phrase, a name, a date, a time, or a monetary expression. According to some embodiments, the words w3 and w4 may be individual EIs. In other instances words w3 and w4 may be distinct EIs.

Several different types of EIs 210 may be extracted by the extraction module 202, including core noun phrases, dates, times, monetary expressions, and names. A core noun phrase is a noun phrase with no other noun phrases embedded therein (i.e., it is the smallest noun phrase). According to one embodiment, rule-based approaches or trainable chunk parsers may be used by the extraction module to recognize core noun phrases. Various information extraction process known in the art, including, for example, the IDENTIFINDER system offered by BBN Technologies Corp., headquartered in Cambridge, Mass., may be employed by the extraction module 202, to identify EIs in the text.

Figure 3A:
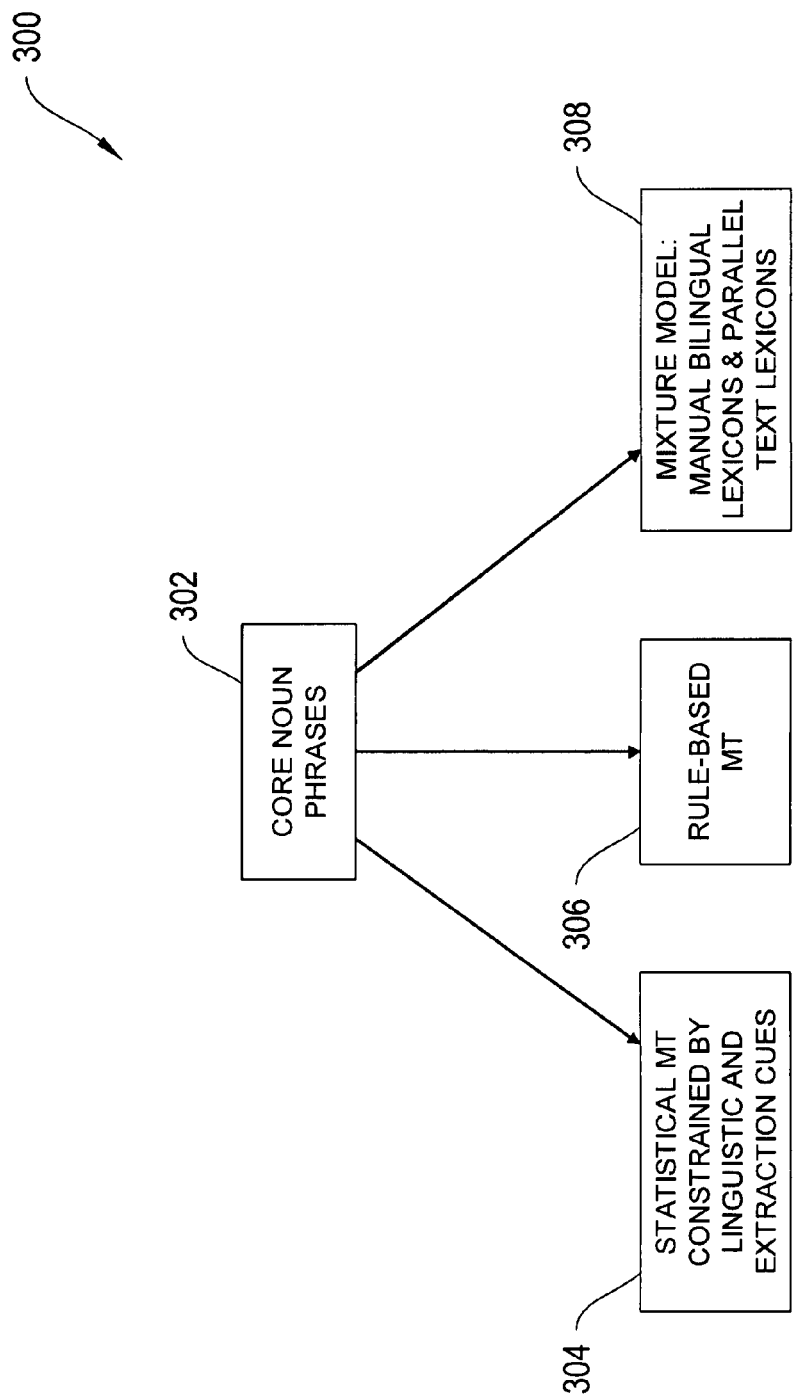

FIGS. 3A-3C depict translation processes for exemplary elements of information. In FIG. 3A, the illustrative element of information is a core noun phrase 302. The core noun phrase 302 may be translated using one of three possible translation processes know in the art. The first translation process 304 is statistical machine translation, which may be constrained by linguistic and extraction cues. The second translation process 306 is rule-based machine translation. The third translation process 308 is a mixture model including direct translation using manual bilingual lexicons and parallel text lexicons. The translation process may be selected based on the first or second language or the core noun phrase 302. In some embodiments, the selected translation process is predetermined.

The second translation process 306 is rule-based. Many core noun phrase structures in a first language may be translated to a second language word by word with some changes in word order. For many core noun phrase structures, the change in word order, or the mapping of the core noun phrase structure in the first language to a core noun phrase structure in the second language, is predictable. Thus, these core noun phrases may be reliably handled by transfer rules and lexicon lookup. The transfer rules may be provided by bilingual experts. In some embodiments, the transfer rules may be learned by a statistical algorithm using parallel text corpora.

The third translation process 308 is a mixture model combining manual bilingual lexicons and lexicons learned from parallel text corpora. The combination of manual and automatic lexicons can greatly improve performance. Since resources are scarce for Less Commonly Taught Languages (LCTLs), resource combination will be even more useful to good MT performance. Given translation probabilities p(a|e, $d_i$) for an English word e and a foreign word a in dictionaries $d_i$s, the mixture model combines them into a single probability estimate:

$$p(a|e) = \sum_{all\, d_i's} \lambda_i p(a|e, d_i)$$

where $\Sigma \lambda_i = 1$. $\lambda_i$ is the coefficient given to source $d_i$. The coefficients can be tuned to maximize translation performance.

In FIG. 3B, the illustrative elements of information are a date 320, a time 322, and a monetary expression 324. Generally, dates 320, times 322, and monetary expressions 324 are translated using rule-based machine translation 326. The rule-based machine translator uses semantic rules of the target language for the corresponding type of information to translate the input EI.

Date, time, and monetary expressions usually follow simple patterns and can be converted to a standard format by an appropriate set of rules. Thus, hand-crafted grammars may be used to handle date and time expressions for many languages. According to one embodiment, date and time expressions in a first language are re-formatted to a numerical representation (e.g., "May 21, 2001" will be represented as "2001-5-21"). In another embodiment, date and time expressions are reformatted using other standard formats, such as the format specified in the TIMEX 2 annotation guideline used by the TIDES program. The re-formatted date and time expressions are then translated directly. Some date and time expressions cannot be normalized (e.g. "during Tom's birthday party"), and for these expressions, statistical machine translation 328 is used. Similar techniques are used to develop grammars for rule-based machine translation of monetary expressions.

In FIG. 3C, the illustrative EI is a name 340. The name 340 may be a proper name, and it may be the name of a person or a place. The translation process 342 used to translate the name 340 is transliteration. The translation process may be a trainable transliteration algorithm, or it may be created manually.

According to one embodiment, a trainable transliteration algorithm is context dependent. Given a foreign name A, the model searches for the most likely English transliteration E. According to Bayes rule, maximizing P(E|A) is the same as maximizing P(E)P(A|E). P(E) is the language model probability, and may be estimated from a large English corpus. P(A|E) is estimated from the training data. The training data may be a list of names transliterated by humans. In one example, $E = e_1 e_2 \ldots e_n$, where $e_1 e_2 \ldots e_n$ are the phonemes in an English word, and $A = a_1 a_2 \ldots a_n$, where $a_1 a_2 \ldots a_n$ are the phonemes in the foreign word. The model generates A from E, by probabilistically mapping $e_i$s to $a_i$'s one by one, starting with the leftmost phoneme. The model assumes the probability that $e_i$ generates $a_i$ depends not only on $e_i$ and $a_i$, but also on $e_{i-1}$ and $a_{i-1}$, to capture the dependences between adjacent phonemes. For example, the pronunciation of the English grapheme "ch" maps to different phonemes depending on whether it is preceded by "s" or not, e.g. "school" vs "choose". Using this assumption, the following formula holds:

$$P(A \mid E) = P(a_1 \mid e_1) \prod_{1 < i \le n} P(a_i \mid e_i, e_{i-1}, a_{i-1})$$

$P(a_i|e_i, e_{i-1}, a_{i-1})$ is estimated from the training data using the Expectation Maximization (EM) algorithm. The EM algorithm is used because there are often multiple ways to segment a letter sequence into phonemes. Thus, a name pair may have many possible alignments. The EM algorithm can factor in the probabilities of different alignments in parameter estimation. In other embodiments, direct counting is used instead of the EM algorithm.

The number of name pairs used for training the algorithm may be reduced by smoothing the above context-aware model with a simpler model (e.g., a context-independent model):

$$P_{smooth}(a_i|e_i,e_{i-1},a_{i-1}) = \lambda P(a_i|e_i,e_{i-1},a_{i-1}) + (1-\lambda)P(a_i|e_i)$$

According to one embodiment, a few thousand name pairs are used to train the model. The cost to create the training data for a new language may be about 1-2 weeks by a bilingual speaker. In some embodiments, the model is trained using corpora rich in named entities, such as phonebooks or the Word Wide Web, as well as traditional text or conversational corpora.

In an alternative implementation, the process selected to translate a name depends on the semantic type of the name. For example, names of people are translated using a transliteration process. Names of organizations are translated using a hybrid translation/transliteration process, and names of geopolitical entities are translated using a bilingual lexicon.

Referring back to FIG. 2, the remainder of the text 212 is translated using statistical machine translation. Statistical MT chooses the most likely sentence e in English, given a sentence f in a foreign language, i.e., that maximizes p(e|f). Because of Bayes rule, maximizing p(e|f) is the same as maximizing p(f|e)p(e). P(f|e) estimates how well e preserves the meaning of f and p(e) estimates the fluency of e. In other words, an ideal translation should carry the meaning of the original sentence and be fluent. Models of p(e) known in the art have essentially been limited to literal word sequences (bi-grams, tri-grams, and 4-grams). Estimating p(e|f) is typically factored into two parts: a "translation" probability for a word/word sequence independent of context and a "distortion" probability to model movement, i.e., the difference in word order between f and e. Distortion models have assumed arbitrary words are placed first, and nearby words are moved with respect to them. Key to the performance of these systems is the availability of massive amounts (e.g., 80 million words) of translated documents for the major U.N languages (Arabic, Chinese, English, French, Russian, and Spanish). Translation models have recently moved from assuming each word is translated independently to short word sequences.

Figure 4:
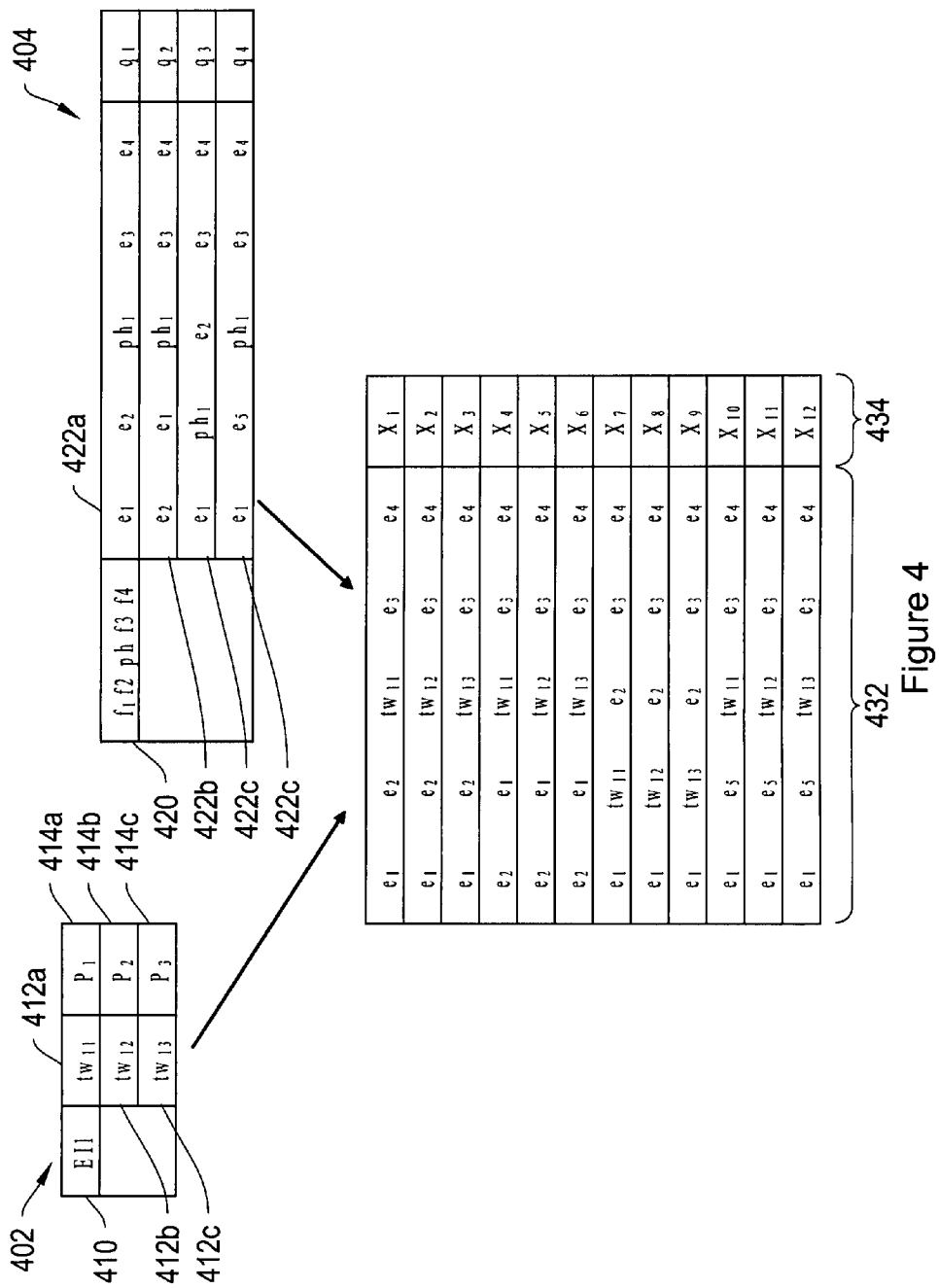
FIG. 4 demonstrates the merging of the outputs from a specialized translation process and a statistical MT process.

FIG. 4 demonstrates the merging of the specialized translation process output 402 with the statistical machine translation output 404 for a sentence being translated. In the illustrative example, for a selected element of information (EI1) 410 extracted from the sentence, the specialized translation process outputs three possible translated words 412a-412c ($tw_{11}$, $tw_{12}$, and $tw_{13}$), each having a corresponding probability 414a-414c ($p_1$, $p_2$, and $p_3$) of being correct. For the remainder 420 of the sentence ($f_1$ $f_2$ $ph_1$ $f_3$ $f_4$), the statistical machine translation process outputs four possible translations 422a-422d ($e_1$ $e_2$ $ph_1$ $e_3$ $e_4$; $e_2$ $e_1$ $ph_1$ $e_3$ $e_4$; $e_1$ $ph_1$ $e_2$ $e_3$ $e_4$; and $e_1$ $e_5$ $ph_1$ $e_3$ $e_4$) each having a corresponding probability 424a-424d ($q_1$, $q_2$, $q_3$, and $q_4$) of being correct.

As shown in the illustrative example, the remainder 420 of the sentence includes 4 foreign words $f_1$, $f_2$, $f_3$, and $f_4$ and a placeholder $ph_1$. As may occur in actual translation, the illustrative potential translations 422a-422d include different word orders for the translated words $e_1$, $e_2$, $e_3$, and $e_4$ (e.g., the first translation 422a vs. the second translation 422b), different word orders for the translated words $e_1$, $e_2$, $e_3$, and $e_4$ with respect to the placeholder $ph_1$ (e.g., the first translation 422a vs. the third translation 422c), and different translation of the foreign words $f_1$, $f_2$, $f_3$, and $f_4$ to translated words (e.g. the translation of the second foreign word $f_2$ in the first translation 422a vs. the fourth translation 422d). Word order determinations and corresponding probabilities can be derived by the statistical MT process based on a supervised or unsupervised training process. In practice, both the specialized translation process 402 and the statistical machine translation process 404 may output any selected number of translations and corresponding probabilities. In some embodiments, the translations processes 402 and 404 may eliminate selected translations 412a-412c and 422a-422d based on the corresponding probabilities 414a-414c and 424a-424d of the selected translation. For example, translations of an EI 410 or a sentence remainder 420 with probabilities that fall below a selected threshold may be eliminated. Alternatively, the system may only maintain a selected number of highest probability potential translations. For example, if the specialized translation process 402 is configured to output the three most likely translations, any potential identified translation with a probability that is lower than three other potential translations is eliminated from contention.

As shown in FIG. 4, the specialized translation process output 402 is merged with the statistical machine translation output 404 resulting in the merged translation output 430 to form a set of potential sentence translations Oct. 22, 2007. According to the illustrative embodiment, the potential sentence translations 432 include combinations of the merger of the statistical machine translations 422a-422d with the placeholder $ph_1$ replaced with the translated EI 410 possibilities, i.e., words 412a-412c, output by the specialized translation process. Each potential sentence translation 432 has a corresponding overall probability score 434 ($x_1$-$x_{12}$). The overall probability score $x_i$ of ith potential sentence translation is calculated as a function of the probability $p_i$ that the EIs in the potential sentence translation are correct, the probabilities $q_i$ that the translation of the remainder of the sentence is correct, and the probability of the potential sentence translation existing in the target language. To obtain this last probability, the entire potential sentence translation is compared to a language model for the target language. In one embodiment, the potential sentence translation with the highest overall probability is selected as the correct translation.

In an alternative implementation, the machine translation system 100 also generates translations of the sentences that leave one or more EIs in the sentence, without replacing them with placeholders. In this embodiment, each sentence is scored with an additional parameters corresponding to the likelihood that the each EI should have been treated as an EI (i.e., be replaced with a place holder), as opposed to being treated as an ordinary word or span of words. The likelihood can be a probability or an unnormalized score, and can be combined with the other scores discussed above to yield a final score.

In another implementation, the translation process occurs in a more iterative fashion. For example, instead of translating entire sentences at a time, individual phrases are translated as described above, yielding a set of potential phrase translations. The number of potential translations of the phrase may be predetermined (i.e., the n most likely translations), or the number may vary based on how many possible phrase translations have probabilities over a predetermined threshold. Next, as consecutive phrases are translated, the probability of ordered combinations of such phrases are evaluated, and low probability combinations are eliminated. The process continues until the translation of sentence is complete. In one implementation, the iteration stops at this point, and the potential combination of phrases with the highest probability is selected as a correct translation. Alternatively, the final selection of a translation is only made after evaluating the probability of an entire paragraph.

After translation is complete, the translated document is saved in memory for later output and analysis, output immediately to a user via a printer or display, and/or fed into another text analysis program for further analysis and processing.

According to one implementation, the statistical MT process module 114 is trained to detect clusters of words that remain together during translation. Such information may be retained within the statistical MT process module 114 in the form of statistics, or as an ancillary rule, referred to as an agreement constraint, that limits the potential outputs of the statistical MT process 114. That is, outputs that fail to meet the agreement constraint may be assigned low probabilities, or they may be eliminated as potential translations, altogether. Similar agreement constraints may also be employed by one or more of the specialized translation process modules 110.

Figure 5:
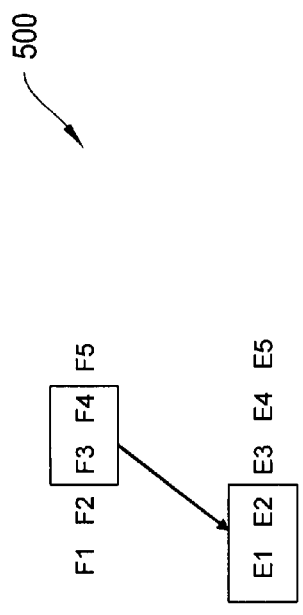
FIG. 5 depicts an example of an agreement constraint.

FIG. 5 depicts an example 500 of an agreement constraint that may be applied to the translation process in one embodiment of the invention. In the example 500, a phrase including 5 foreign language words f1, f2, f3, f4, and f5 is translated to an English sentence including 5 English words e1, e2, e3, e4, and e5. Two of the foreign language words (f3 and f4) are clustered together, and the translation process is constrained such that the translation of these two words (i.e., English words e1 and e2) is also clustered together. Including an agreement constraint in the possible word orders of the statistical machine translation output 404 and the merged translations 432 of FIG. 4 restricts the possible translations that are considered, thereby automatically eliminating unlikely translations.

Figure 6:
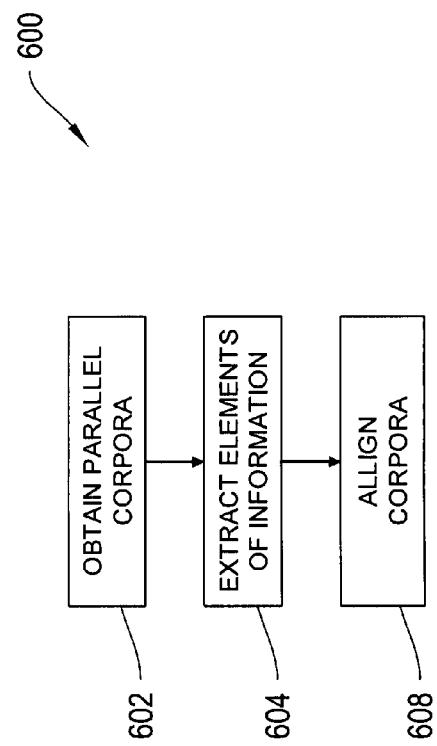
FIG. 6 is a flow chart of a method of training a machine translation process to enforce the agreement constraint described in relation to FIG. 5.

FIG. 6 is a flow chart of a method 600 of training a machine translation process to enforce the agreement constraint described in relation to FIG. 5. For example, the method 600 may be applied to train the statistical machine translation process 114 or the merge module 122 of FIG. 1. The method begins obtaining large parallel corpora in multiple languages, i.e., the corpora include the same content in different languages (step 602). Next, an information extraction module processes each corpus to identify EIs in each corpora (step 604). Next the words and elements in the parallel corpora are aligned to one another (step 606). That is, it is determined which words in a first corpus correspond to particular words in the second corpus. The alignment can be carried out using statistical learning techniques, based, for example, on co-occurrence statistics. A constraint, however, is applied to the alignment process requiring that each element of information identified in the parallel corpora are aligned to contiguous self contained spans of text, as described for example in FIG. 5. In addition, the EIs can only be aligned to EIs of the same type. For example, person names must align to person names, geopolitical entity names must align to geopolitical names, etc.

These constraints may be applied in the at least three possible ways. In one implementation, during the alignment process of training the machine translation process, identified EIs are replaced with placeholders and such place holders can only be aligned to other EIs. In a second implementation, during operation of the process to translate text, the constraints are applied when generating potential translated sentences, by only generating sentences in which EIs in the first language are replaced with EIs in the second language. In a third implementation, also applied during application of the process to text for translation, the constraints are applied when scoring potential sentences. For example, potential sentences that fail to meet the constraints are removed from consideration or have their score reduced based on the failure.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A method for automatically translating a document from a first language to a second language comprising:

receiving the document in the first language;

processing the document to extract elements of information;
determining, using a processor, a plurality of potential translations for each of the extracted elements of information using a first translation process and a likelihood value for each of the potential translations of the elements of information;
determining a plurality of potential translations of a remainder of the document using a second, different translation process and a likelihood value for each potential remainder translation;
generating a plurality of combinations by combining a plurality of the potential translations of the elements of information with a plurality of the potential remainder translations;
determining a likelihood value for respective ones of a plurality of the combinations based on a model of the second language and corresponding likelihood values of each of the potential element of information translations and remainder translations included in the respective combinations; and
forming a translated version of the document based on the likelihood values of the combinations.

2. The method of claim 1, wherein the elements of information comprise names of named entities, and the first translation process comprises a transliteration process.

3. The method of claim 1, wherein the first translation process further comprises at least one of a statistical translation process, a transfer rule-based translation process, and an application of a bilingual name lexicon depending on a semantic type of the named entities.

4. The method of claim 1, wherein the elements of information comprise at least of one of dates, times, and amounts, and the first translation process comprises applying semantic rules for the second language associated with a corresponding class of information.

5. The method of claim 1, wherein the elements of information comprise core noun phrase descriptions and the first translation process comprises employing a mixture model to translate the extracted elements of information.

6. The method of claim 5, wherein employing the mixture model includes employing a statistical translation process combined with a dictionary translation process.

7. The method of claim 1, wherein the first translation process includes applying syntactic and semantic transfer rules.

8. The method of claim 1, wherein the second translation process includes employing a statistical translation process.

9. The method of claim 1, further comprising
identifying a span of at least two words that are related, and translating the words of the span as a cluster.

10. The method of claim 1, wherein the remainder of the document, prior to translation, includes placeholders for original locations of the extracted elements of information.

11. The method of claim 10, wherein the translated remainder of the document includes placeholders for insertion of the translated elements of information.

12. A method for automatically translating a document from a first language to a second language comprising:
receiving the document in the first language;
determining, using a processor, a plurality of potential translations of a first portion of the document to the second language using a first translation process and a likelihood value for each potential first portion translation;
determining a plurality of potential translations of a second portion of the document to the second language using a second, different translation process and a likelihood value for each potential second portion translation;
generating a plurality of combinations by combining a plurality of the potential translations of the first portion with a plurality of the potential translations of the second portion;
determining a likelihood value for respective ones of a plurality of the combinations based on a model of the second language and corresponding likelihood values of each of the potential translations of the first portion and the potential translations of the second portion; and
forming a translated version of the document based on the likelihood values of the combinations.

13. The method of claim 12, comprising:
extracting the first portion from the document; and
replacing the first portion in the document with placeholders to form the second portion.

14. The method of claim 12, wherein the first translation process is at least partially rule driven and the second translation process is statistics-based.

15. A system for automatically translating a document from a first language to a second language comprising:
a first processor for receiving the document in the first language and processing the document to extract elements of information;
a second processor for determining a plurality of potential translations for each of the extracted elements of information using a first translation process and a likelihood value for each of the potential translations of the elements of information;
a third processor for determining a plurality of potential translations of a remainder of the document using a second, different translation process and a likelihood value for each potential remainder translation;
a fourth processor for generating a plurality of combinations by combining a plurality of the potential translations of the elements of information with a plurality of the potential remainder translations;
a fifth processor for determining a likelihood value for respective ones of a plurality of the combinations based on a model of the second language and corresponding likelihood values of each of the potential element of information translations and remainder translations included in the respective combinations; and
a sixth processor for forming a translated version of the document based on the likelihood values of the combinations.

16. A non-transitory computer-readable medium containing computer-executable instructions, which when executed by a computer carry out a method for translating a document from a first language to a second language, comprising:
receiving the document in the first language;
processing the document to extract elements of information;
determining, using a processor, a plurality of potential translations for each of the extracted elements of information using a first translation process and a likelihood value for each of the potential translations of the elements of information;

determining a plurality of potential translations of a remainder of the document using a second, different translation process and a likelihood value for each potential remainder translation;

generating a plurality of combinations by combining a plurality of the potential translations of the elements of information with a plurality of the potential remainder translations;

determining a likelihood value for respective ones of a plurality of the combinations based on a model of the second language and corresponding likelihood values of each of the potential element of information translations and remainder translations included in the respective combinations; and forming a translated version of the document based on the likelihood values of the combinations.

* * * * *